April 12, 1932.  H. H. FRANKS  1,853,727
WRIST PIN
Filed Jan. 20, 1930  3 Sheets-Sheet 1

INVENTOR
Harry H. Franks
BY
ATTORNEY

April 12, 1932.   H. H. FRANKS   1,853,727
WRIST PIN
Filed Jan. 20, 1930   3 Sheets-Sheet 2

INVENTOR
Harry H. Franks
BY
ATTORNEY

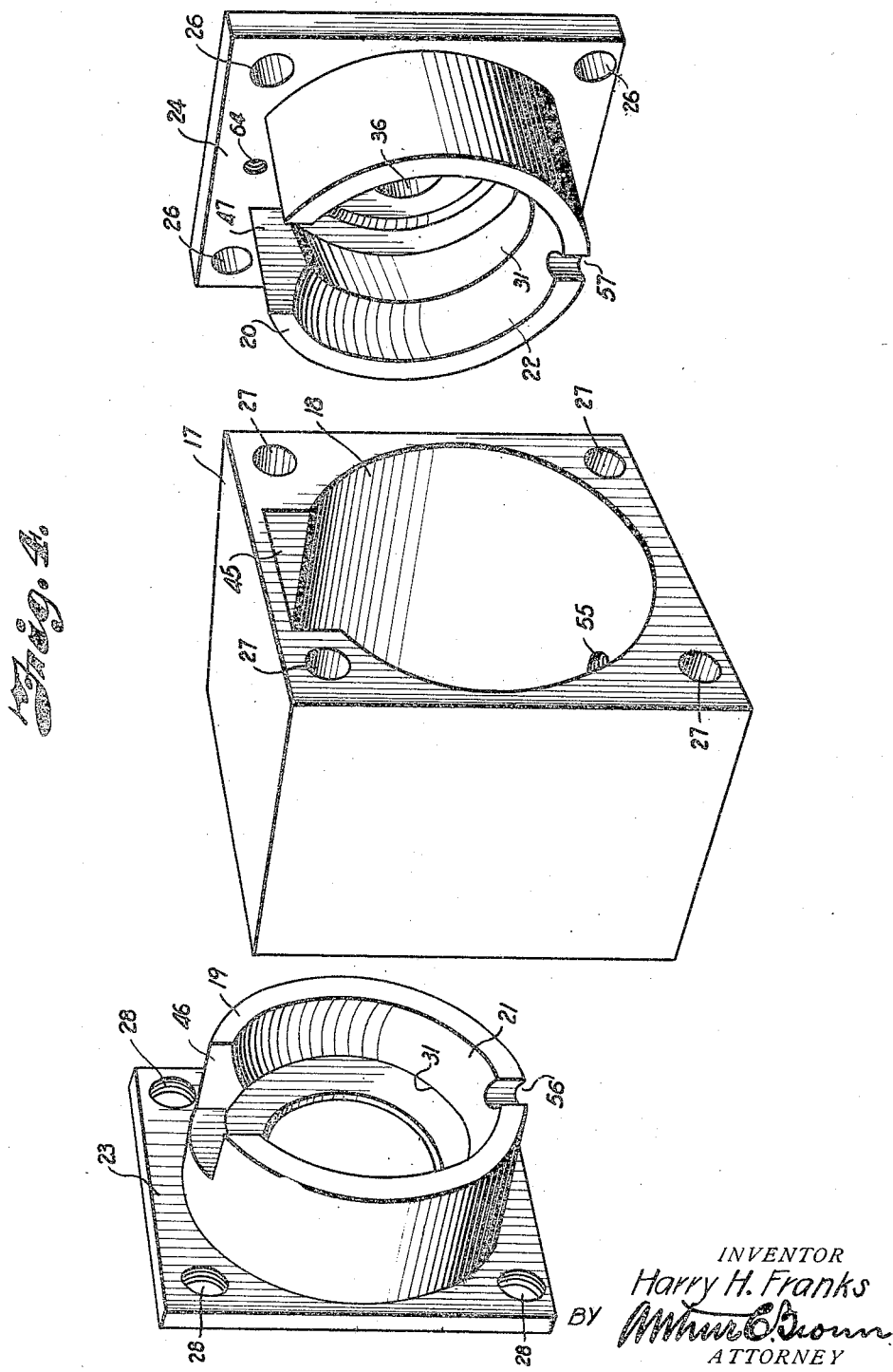

Patented Apr. 12, 1932

1,853,727

UNITED STATES PATENT OFFICE

HARRY H. FRANKS, OF TULSA, OKLAHOMA, ASSIGNOR OF THREE-FOURTHS TO TIDAL OIL COMPANY, OF TULSA, OKLAHOMA, A CORPORATION OF OKLAHOMA

WRIST PIN

Application filed January 20, 1930. Serial No. 422,010.

My invention relates to wrist pins, and more particularly to wrist pins of the type employed in oil field equipment for connecting the walking beam pitman with its operating crank of a well rig, the principal object of the invention being to eliminate torsional strains on a wrist pin due to misalignment of the walking beam or its operating crank.

In accomplishing this and other objects of the invention, I have provided improved details of structure, the preferred form of which is illustrated in the accompanying drawings, wherein:

Fig. 4 is a disassociated, perspective view of the component parts of the bearing housing.

Figure 1:
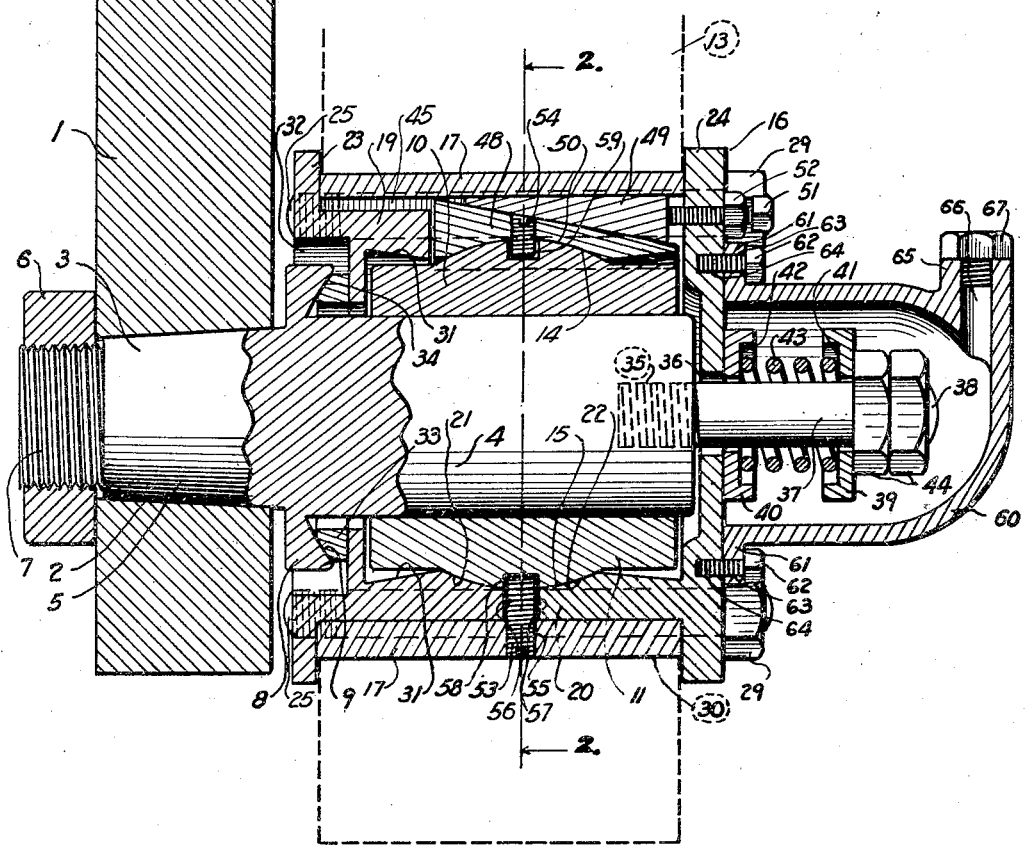
Fig. 1 is a vertical section through a portion of a crank and its pitman, illustrating a wrist pin and wrist pin bearing embodying my invention.
Figure 5:
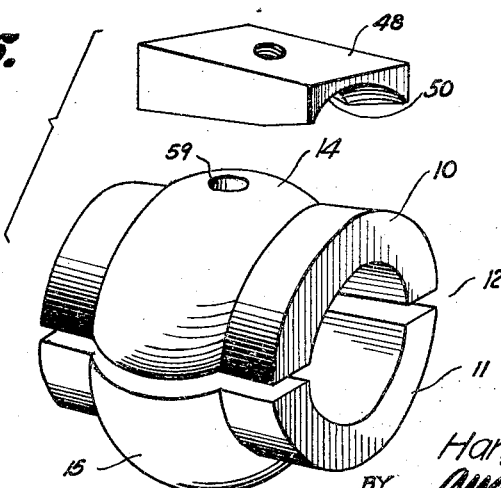
Fig. 5 is a detail, perspective view of the bearing sleeve members and the lower wedge for adjusting the bearing.
Figure 2:
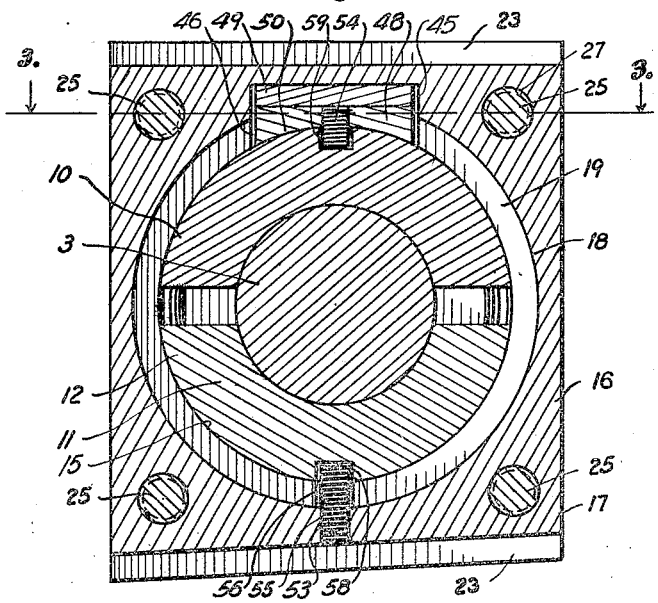
Fig. 2 is a cross sectional view through the bearing and wrist pin on the line 2—2, Fig. 1.

Referring more in detail to the drawings: 1 designates the lower end of a crank having a tapered opening 2 for receiving a wrist pin 3 comprising a cylindrical bearing portion 4 having a tapered end 5 complementary to the tapered bore 2 in the crank, the wrist pin being retained in the bore by a nut 6 threaded on an extension 7 projecting from the end of the tapered portion 5 and engaging the inner face of the crank to draw the tapered portion of the pin tightly into the opening 2 to prevent rotation of the pin in the opening during operation of the crank.

Formed on the wrist pin between the bearing portion 4 and the tapered portion 5 is a stop collar 8 having a concave outer face 9 for a purpose later described.

Received on the bearing portion of the wrist pin are upper and lower bearing members 10 and 11 which constitute a substantially cylindrical bearing sleeve 12 for the pitman 13, and formed on the outer periphery of the bearing members midway of their length are substantially semi-spherical collars 14 and 15 for a housing 16 now described. The housing 16 preferably includes a rectangular block 17 having a longitudinal bore 18 of substantially larger diameter than the spherical portion of bearing members 10 and 11 for accommodating collar members 19 and 20. The collar members are sleeved in opposite ends of the bore 18 and their inner faces are provided with annular concave seats 21 and 22 for snugly receiving the spherical portions of the bearing members so that the housing block may rock radially on the spherical portions of the bearing members.

Figure 3:
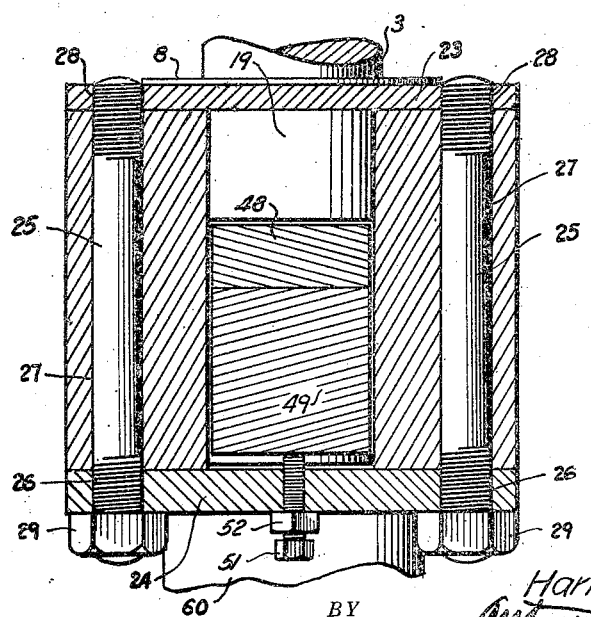
Fig. 3 is a horizontal, sectional view through the bearing housing on the line 3—3, Fig. 2.

In order to retain the collar members in seating relation with the bearing members, the collars 19 and 20 are preferably provided on their outer ends with integral rectangular plates 23 and 24 which are secured to the ends of the block 17 by stud bolts 25. The bolts 25 preferably extend through openings 26 provided in the outer plate 24 and through openings 27 extending longitudinally through the corners of the block and are anchored in threaded openings 28 formed in the plate 23. The bolts 25 are of sufficient length to protrude through the plate 24, and the block is clamped between the plates by nuts 29 threaded on the projecting ends of the bolts as clearly shown in Fig. 3.

The housing member above described is received in a rectangular opening 30 formed in the pitman 13, and the upper and lower edges of the plates 23 and 24 preferably project beyond the upper and lower sides of the block to retain the housing in the pitman as shown in Fig. 1.

The inner surfaces of the collars between the plates and the concave seats are preferably tapered outwardly over the ends of the bearing members as at 31 to provide free rocking movement of the housing on the wrist pin.

The inner plate 23 is preferably provided with an annular recess 32 about the wrist pin, and received therein and engaging the concave outer face of the collar is a washer 33 having a convex outer face 34 complementary to the concavity of the collar 8 for sealing the interior of the housing against escape of lubricant during rocking movement on the wrist pin.

Threaded into a bore 35 formed in the outer end of the wrist pin and projecting through an aligning opening 36 in the plate 24 is a stud 37 having a threaded outer end 38, and received on the stud are spaced washers 39 and 40 having facing annular seats 41 and 42 for receiving the ends of an expansion spring 43 which is also sleeved on the stud. The spring is tensioned by lock nuts 44 threaded on the end of the stud, so that the spring exerts pressure on the housing to retain the washer in seating engagement with the collar 8 and prevent its outward longitudinal movement on the wrist pin.

Formed in the housing at the upper portion of the bore 18 is a rectangular slot or groove 45 aligning with complementary slots 46 and 47 formed in the collars 19 and 20, as shown in Fig. 4, and received therein are wedge-shaped blocks 48 and 49 for adjusting the bearing sleeve on the wrist pin. The wedge block 48 is preferably provided with a concave recess 50 to seat on the upper periphery of the sleeve member 10 which is exposed through the slots, and the wedge 49 is received on and adapted for sliding engagement with the wedge 48 by a set screw 51 threaded through the plate 24. The end of the set screw 51 bears against the wedge block 49 so that when the screw is rotated in the plate the wedge 49 sliding between the bottom of the groove 45 and the inclined face of the wedge 48 moves the bearing members closer to the wrist pin to compensate for the wear that may occur between the parts. The screw may be locked in adjusted position by a lock nut 52 received thereon and adapted to be tightened against the plate.

In order to retain the sleeve members 10 and 11 against longitudinal movement and yet provide for rocking movement of the housing on the spherical portions of the sleeve members, I provide set screws 53 and 54, the set screw 53 being threaded through an opening 55 formed in the lower side of the block 17 and through aligning notches 56 and 57 in the abutting ends of the collars 19 and 20, and the end is loosely received in a recess 58 formed in the bearing member 11.

The screw 54 is threaded through the lower wedge 48 into a recess 59 provided in the outer faces of the bearing member 10.

In order to lubricate the bearing and to retain the lubricant therein, I enclose the stud 37 with a cap 60 having a laterally projecting flange 61 for attaching the cap to the plate 24, the cap being retained by screws 62 projected through openings 63 in the flange and into threaded openings 64 formed in the outer side of the plate 24. Formed on the outer end of the cap is a vertical boss 65 having a port 66 through which lubricant may be admitted into the cap 60, the port being closed by a cap screw 67 threaded in its outer end.

In assembling a wrist pin and bearing constructed as described, the wrist pin is inserted in the opening 2 of the crank and retained by the nut 6. The washer 33 and the collar 19 are then sleeved on the wrist pin and the stud bolts 25 are threaded into the openings 28 formed in the plate 23.

The block 17 is then sleeved on the projecting ends of the stud bolts, after which the wedges 48 and 49 are assembled on the bearing member 10 and the bearing members 10 and 11 are then sleeved on the wrist pin and seated against the collar 19. The collar 20 is then sleeved over the stud 39 and seated against the bearing members 10 and 11. The nuts 29 are then threaded on the projecting ends of the stud bolts 25 to retain the parts in assembled relation. The washers 39 and 40 including the spring 43 are sleeved on the stud 37 and the lock nuts 44 are then threaded on the stud to tension the spring.

The cap 60 is then applied and the lubricant is inserted through the ports 66 to the interior of the bearing through the opening 36 in the plate 24.

The housing being mounted for universal movement on the bearing sleeve will accommodate itself to irregularity of movement of the crank or pitman which may occur and thereby avoid binding and resultant loss of power or damage to the connecting parts.

What I claim and desire to secure by Letters Patent is:

1. In combination with a wrist pin and a pitman, a bearing for the wrist pin comprising a split sleeve on the pin, a bearing housing carried by the pitman, means mounting the housing on the sleeve to provide universal movement of the pitman with relation to the pin, means yieldingly retaining the bearing against longitudinal movement on the pin, and adjusting means for contracting the sleeve on the pin.

2. In a wrist pin having a bearing portion, bearing members on the bearing portion having semi-spherical body portions, a housing having a cylindrical bore, end members in the bore, and having annular seats for engaging the semi-spherical portions of the bearing members and aligning recesses, wedges slidable in the recesses for adjusting the bearing members, and screw-actuated means for actuating the wedges.

3. In a wrist pin having a bearing portion, bearing members on the bearing portion having semi-spherical body portions, a housing having a cylindrical bore, end members in the bore having annular seats for engaging the semi-spherical portions of the bearing members and aligning recesses, wedges slidable in the recesses for adjusting the bearing members, means for actuating the wedges, and means engaging one of the end members for yieldingly retaining the housing from longitudinal movement on the pin.

4. A wrist pin having a bearing portion, bearing members on the bearing portion having semi-spherical body portions, a housing for enclosing the bearing members, collars in the housing and having concave annular seats engaging the body portions of the bearing members, means for preventing longitudinal movement of the bearing members in the housing, and wedge means slidably mounted in the housing for adjusting the bearing members on the bearing portion of the pin.

5. A wrist pin having a bearing portion, bearing members on the bearing portion having semi-spherical body portions, a housing for enclosing the bearing members, collars in the housing having concave annular seats engaging the body portions of the bearing members, means for preventing longitudinal movement of the bearing members in the housing, wedge means slidably mounted in the housing for adjusting the bearing members on the bearing portion of the pin, and screw-actuated means for moving the wedges.

6. In a wrist pin having a bearing portion, a bearing sleeve on the bearing portion, a housing enclosing the sleeve and having universal mounting thereon, a stud extending from the outer end of the wrist pin, washers on the stud, a spring sleeved on the stud and received between the washers, and means for tensioning the spring to yieldingly retain the housing against longitudinal movement on the wrist pin.

7. In a wrist pin having a bearing portion and a tapered attaching portion and a stop collar separating said portions, bearing members on the bearing portion of the pin having substantially semi-spherical body portions, a housing enclosing the bearing members, sealing means between the housing and the collar, means in the housing engaging the body portions of the bearing members, and yielding means for retaining the housing in sealing engagement with the collar on the wrist pin.

8. In a wrist pin bearing including upper and lower bearing members having substantial semi-spherical body portions, collars having concave annular seats engaging the body portions of the bearing members and having aligning slots, a wedge received in said slots and having a concave recess for engaging one of the bearing members, means for retaining the wedge against lateral movement with relation to the bearing member, and a second wedge slidable in said slots and engaging the first wedge for radially adjusting the bearing members.

In testimony whereof I affix my signature.

HARRY H. FRANKS.